(12) United States Patent
Kitahara et al.

(10) Patent No.: US 8,170,232 B2
(45) Date of Patent: May 1, 2012

(54) VEHICLE-MOUNTED DEVICE

(75) Inventors: Yoko Kitahara, Tokyo (JP); Fumihisa Mizuochi, Saitama (JP); Takuma Higo, Tokyo (JP); Takaharu Fujii, Saitama (JP); Masaru Kataoka, Tokyo (JP); Nobuo Ozawa, Kanagawa (JP); Tatsuya Yamazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 794 days.

(21) Appl. No.: 12/241,501

(22) Filed: Sep. 30, 2008

(65) Prior Publication Data

US 2009/0097673 A1    Apr. 16, 2009

(30) Foreign Application Priority Data

Oct. 15, 2007   (JP) ................... 2007-268374

(51) Int. Cl.
*H04B 1/00* (2006.01)
(52) U.S. Cl. ....................................................... 381/86
(58) Field of Classification Search .................. 381/86
See application file for complete search history.

(56) References Cited

U.S. PATENT DOCUMENTS

| | | | |
|---|---|---|---|
| 5,270,689 A | 12/1993 | Hermann | |
| 7,849,482 B2 * | 12/2010 | Sharkey | 725/46 |
| 2005/0096812 A1 * | 5/2005 | Nezu et al. | 701/36 |
| 2006/0046778 A1 | 3/2006 | Hembree | |
| 2009/0031343 A1 * | 1/2009 | Sharkey | 725/39 |

FOREIGN PATENT DOCUMENTS

| | | |
|---|---|---|
| GB | 2 420 842 A | 6/2006 |
| JP | 2003-123448 | 4/2003 |
| JP | 2004-157661 | 6/2004 |
| JP | 2006-343933 | 12/2006 |
| JP | 2007-213209 | 8/2007 |
| WO | WO 2005/122199 A1 | 12/2005 |
| WO | WO 2006/065572 A3 | 6/2006 |

* cited by examiner

*Primary Examiner* — Thao Le
(74) *Attorney, Agent, or Firm* — Oblon, Spivak, McClelland, Maier & Neustadt, L.L.P.

(57) ABSTRACT

The present invention is equipped with a USB interface 7 for being connected to a portable music player that is an external device, a browser button 27, a rotary encoder button 26, a back button 28, CPU 31 for acquiring a content list CL from the portable music player, RAM 33 for storing the content list CL acquired by the CPU 31, and a LED processing section 42 for changing how the rotary encoder button 26 illuminates to encourage the next operation at a time when the browse button 27 is operated. Accordingly, when searching pieces of music content stored in the portable music player that is an external device, one can unknowingly understand how to operate, thereby providing good operability even for searching pieces of music content of the external portable music player.

7 Claims, 13 Drawing Sheets

VEHICLE-MOUNTED DEVICE

CROSS REFERENCES TO RELATED APPLICATIONS

The present invention contains subject matter related to Japanese Patent Application JP2007-268374 filed in the Japanese Patent Office on Oct. 15, 2007, the entire contents of which being incorporated herein by reference.

BACKGROUND OF THE INVENTION

1. Field of the Invention

The present invention relates to a vehicle-mounted device, and is, for example, preferably applied to an audio video device mounted on a vehicle (this audio video device will be referred to as vehicle audio video device, hereinafter).

2. Description of the Related Art

An existing vehicle audio video device is designed to store a large amount of music content in a hard disk or the like situated inside the vehicle audio video device.

In many cases, such a vehicle audio video device classifies and manages the pieces of music content under a hierarchical structure of directories. By operating the vehicle audio video device, a user goes from an upper stratum to a lower stratum to search for his desired pieces of music content (see Jpn. Pat. Laid-Open Publication No. 2004-157661, for example).

SUMMARY OF THE INVENTION

By the way, there is a problem that, since a portable music player that is connected via USB (Universal Serial Bus) interface as an external device is not expected to be used for the above-noted vehicle audio video device, the vehicle audio video device cannot classify and manage using a content list of the portable music player to search for pieces of music content stored in the portable music player.

Moreover, the vehicle audio video device is not user friendly because a plurality of operation buttons are arranged at random on the front of the vehicle audio video device and therefore it is painstaking for a user to find the operation buttons necessary for searching the pieces of music content.

The present invention has been made in view of the above points and is intended to provide a vehicle-mounted device that offers good operability even for searching pieces of music content stored in an external device.

To solve the above problems, a vehicle-mounted device of the present invention includes: a connection section that is connected to an external device; a first operation button that is used to start a process of searching pieces of content stored in the external device; a content list acquisition section that, when the first operation button is operated, acquires from the external device a content list having a hierarchical structure under which the pieces of content are classified as items; a storage section that stores the content list acquired by the content list acquisition section; a second operation button that includes an operation controller that can be rotated and pushed, and, when the operation controller is rotated, selects an item of the content list displayed on a predetermined display section, and, when the operation controller is pushed, changes what is displayed among the content list from an upper stratum to a lower stratum, and sets the item; a third operation button that is used to change what is displayed among the content list from the lower stratum to the upper stratum; and a light emitting control section that performs operation guidance to prompt one to do the next operation by changing light emitting state of the second operation button at a time when the first operation button is operated.

Accordingly, what a user has to operate to find his/her desired piece of content from a content list of an external device are the first operation button, the second operation button, and the third operation button. Since the light emitting state changes according to the operation of the first operation button, it can promote the next operation instinctively without providing special instructions.

According to the present invention, what a user has to operate to find his/her desired piece of content from a content list of an external device are the first operation button, the second operation button, and the third operation button. Since the light emitting state changes according to the operation of the first operation button, it can promote the next operation instinctively without providing special instructions. Thus, the vehicle-mounted device that offers good operability even for searching pieces of content stored in an external device can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 12 is a schematic diagram illustrating a vehicle audio video device according to another embodiment of the present invention; and FIG. 13 is a schematic diagram illustrating how a vehicle audio video device and a portable music player are connected, according to another embodiment of the present invention.

DETAILED DESCRIPTION OF THE PREFERRED EMBODIMENTS

An embodiment of the present invention will be described in detail with reference to the accompanying drawings.

(1) Overall Configuration of Vehicle Audio Video Device

(1-1) Appearance Configuration of Vehicle Audio Video Device

Figure 1A:
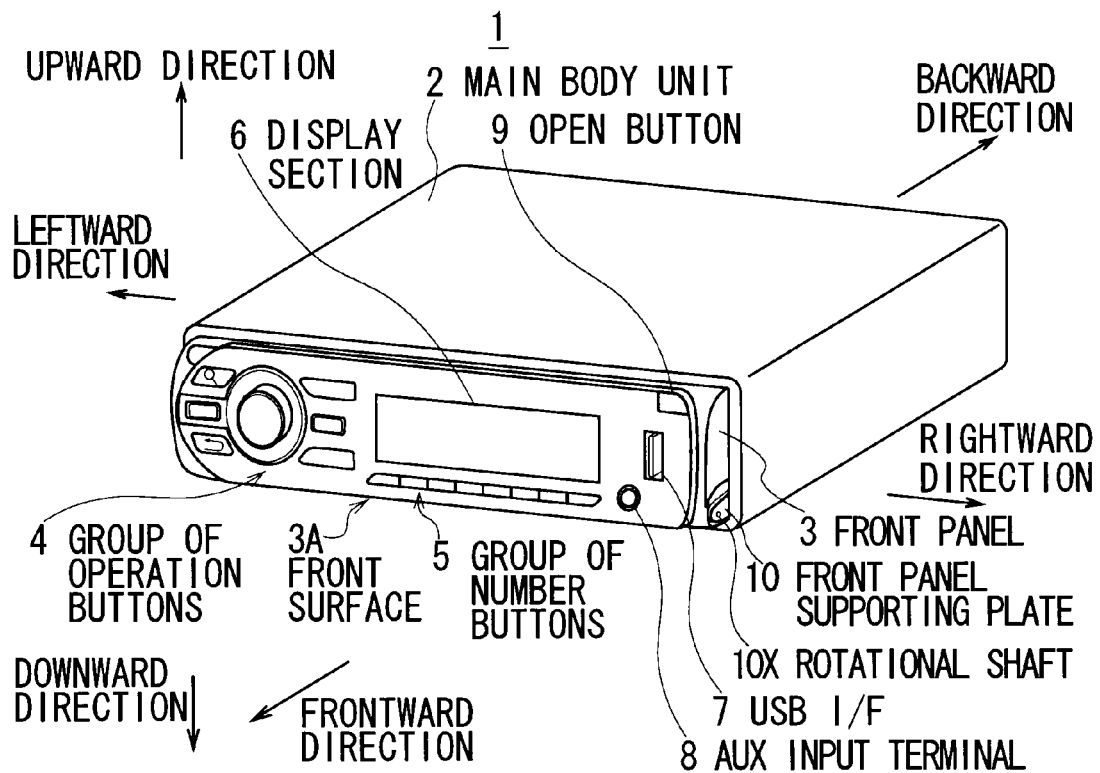
FIGS. 1A and 1B are schematic diagrams illustrating the appearance configuration of a vehicle audio video device.
Figure 1B:
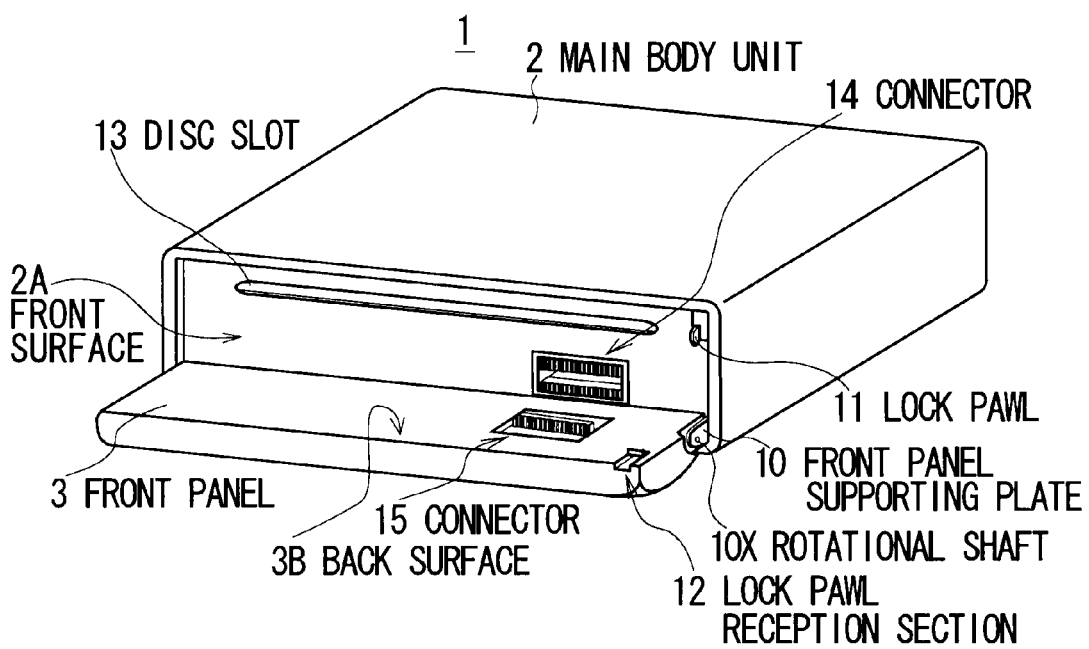

In FIGS. 1A and 1B, the reference numeral 1 denotes a vehicle audio video device as a whole: the vehicle audio video device 1 is the equivalent of the present invention's vehicle-mounted device. A front panel 3 is provided at a front surface 2A of a main body unit 2. When being operated by a user, the vehicle audio video device 1 performs processes, such as receiving radio broadcast or playing a CD, and then outputs sound via a speaker (not shown) connected to the main body unit 2 so that the user can listen to it.

It is expected that a large portion of the main body unit 2 attached to a vehicle (not shown) is placed inside its dashboard with only the front panel 3 exposed outside of the dashboard because of spatial constraints of the vehicle and the like.

Moreover, it is expected that this vehicle audio video device 1 may be attached to a so-called left-hand drive car in which a driver's seat is situated at the left side of the vehicle.

Actually, the size of the vehicle audio video device 1 is determined based on the so-called Deutsche Industrie Normen—German industrial standard (DIN): the width of the main body unit 2 and the front panel 3 is about 178 mm, while the height of the main body unit 2 and the front panel 3 is about 50 mm.

A group of operation buttons 4, a group of number buttons 5, and a display section 6, such as Liquid Crystal Display (LCD), an organic light emitting display (Electroluminescence) or vacuum fluorescent display (VFD), are situated on a front surface 3A of the front panel 3 to serve as a so-called user interface: the group of operation buttons 4 and the group of number buttons 5 allow a user to operate, while the display section 6 provides various kinds of information to the user.

In addition, a USB interface 7 conforming to universal serial bus (USB) specification is provided on the right side of the display section 6 on the front surface 3A of the front panel 3; an auxiliary (AUX) input terminal 8 is situated below the USB interface 7. It is expected that a USB memory conforming to USB specification, a USB cable extending from a portable music player, or the like may be connected to the USB interface 7.

At the bottom of the left and right sides, the front panel 3 is supported by a rotational shaft 10X of a front panel supporting plate 10. The front panel supporting plate 10 is provided at the main body section 2 such that the front panel supporting plate 10 protrudes frontward. In addition, as shown in FIG. 1B, a lock pawl 11 is provided at the front surface 2A of the main body section 2 to keep the front panel 3 closed. A corresponding lock pawl reception section 12 is provided at a back surface 3B of the front panel 3, so that the lock pawl reception section 12 and the lock pawl 11 engage each other.

The front panel 3 is locked after the lock pawl 11 of the main body unit 2 and the lock pawl reception section 12 engage each other. Consequently, as shown in FIG. 1A, the front panel 3 is closed such that the back surface 3B of the front panel 3 faces the front surface 2A of the main body unit 2 while the front surface 3A of the front panel 3 faces frontward (this situation will be referred to as "closed state", hereinafter).

Moreover, an open button 9 is provided at the upper right side of the front panel 3. A user's operation of pushing the open button 9 disengages the lock pawl 11 of the main body unit 2 from the lock pawl reception section 12 of the front panel 3, and therefore the front panel 3 rotates frontward and downward around the rotational shaft 10X of the front panel supporting plate 10. As a result, as shown in FIG. 1B, the front panel 3 is opened such that the front surface 3A faces downward while the back surface 3B faces upward (this situation will be referred to as "opened state", hereinafter).

On the front surface 2A of the main body unit 2, a disc slot 13 is provided: compact disc (CD) media (the diameter and the thickness are approximately 120 mm and 1.2 mm, respectively) are inserted into and ejected from the disc slot 13. By the way, since the disc slot 13 is provided on the front surface 2A of the main body unit 2, the vehicle audio video device 1 can be flexibly designed regarding the number or location of the groups of operation buttons 4 and number buttons 5 on the front panel 3, the size of the display section 6, or the like.

On the front surface 2A of the main body unit 2, a connector 14 is provided: the connector 14 exchanges electric signals with the front panel 3. A corresponding connector 15 is provided on the back surface 3B of the front panel 3: the location of the connector 15 is determined based on the location of the connector 14.

In the closed state, which is illustrated in FIG. 1A, the connectors 14 and 15 are brought into contact with one another. In the closed state, the main body unit 2 is electrically connected to the front panel 3. On the other hand, in the opened state, which is illustrated in FIG. 1B, the connector 14 is separated from the connector 15, thereby electrically disconnecting the front panel 3 from the main body unit 2.

Incidentally, as for the vehicle audio video device 1, it can be expected that, for example, when the vehicle is parked, the front panel 3 is detached from the main body unit 2 to discourage theft or the like. That is the reason why the main body unit 2 can be electrically connected to or separated from the front panel 3 through the connectors 14 and 15.

In this manner, as for the vehicle audio video device 1, the front panel 3 can open and close with respect to the main body unit 2. In the closed state, the front panel 3 is electrically connected to the main body unit 2. In the opened state, the front panel 3 is electrically separated from the main body unit 2.

(1-2) Appearance Configuration of Front Panel

Figure 2:
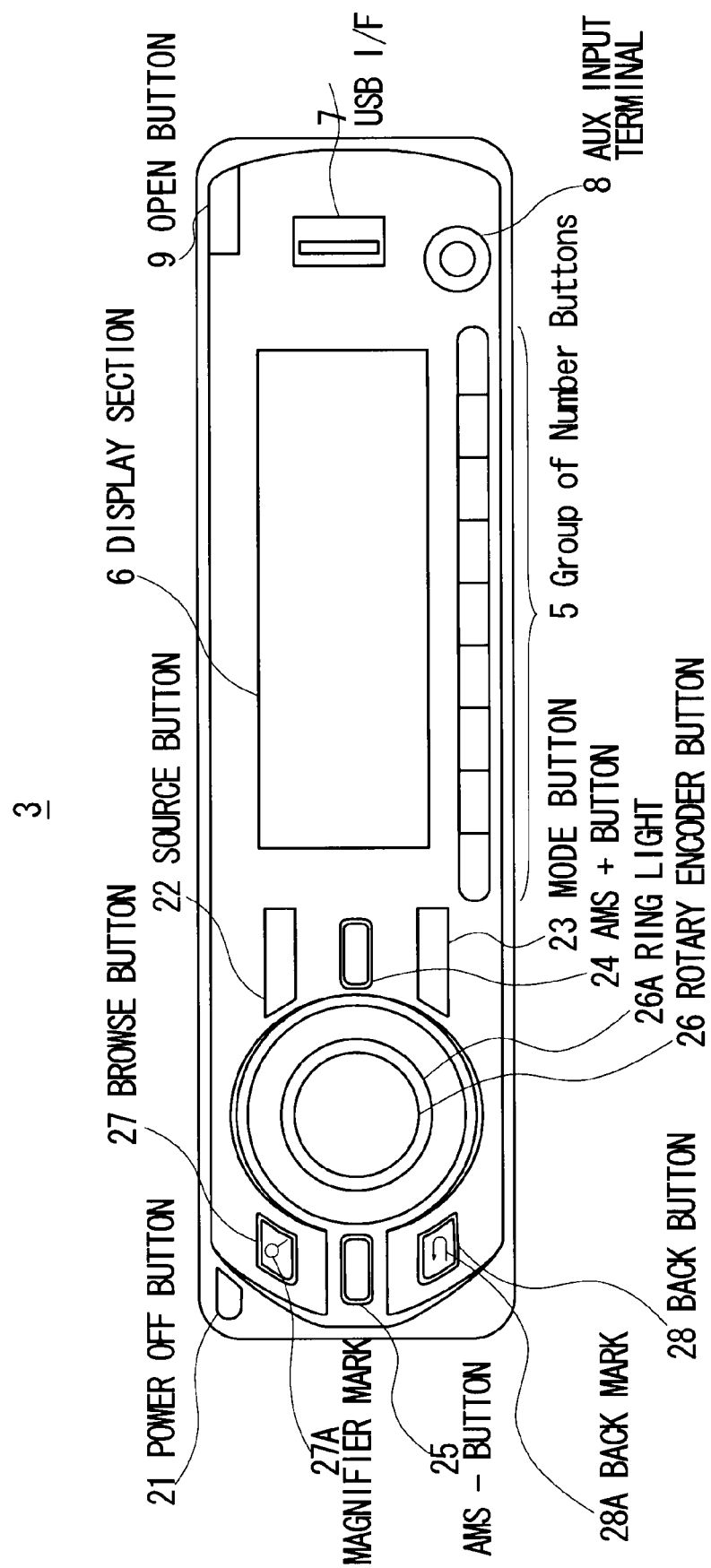
FIG. 2 is a schematic diagram illustrating the appearance configuration of a front panel.

The following describes the configuration of the front panel 3 in detail. On the front surface 3A of the front panel 3, as shown in FIG. 2, at the left side of the display section 6, or the area that is closer to the driver's seat than the display section 6 is, the group of operation buttons 4 (FIG. 1A) is provided: the group of operation buttons 4 includes a power off button 21, a source button 22, a mode button 23, auto music scan (AMS)+button 24, AMS−button 25, a rotary encoder button 26, a browse button 27, and a back button 28.

On the front panel 3, the source button 22 is situated on the upper right side of the rotary encoder button 26, the AMS+ button 24 is situated on the right side of the rotary encoder button 26, the mode button 23 is situated on the lower right side of the rotary encoder button 26, the browse button 27 is situated on the upper left side of the rotary encoder button 26, the AMS−button 25 is situated on the left side of the rotary encoder button 26, and the back button 28 is situated on the lower left side of the rotary encoder button 26.

The rotary encoder button 26 includes an operation controller that can be rotated or pushed for operation; a ring light 26A is situated around the operation controller. The ring light 26A is made of transparent materials and the like. The right light 26A is designed to light up or blink by turning on a light emitting diode (LED) provided inside the ring light 26A.

The browse button 27 and the back button 28, too, are made of transparent materials and the like. The browse button 27 and the back button 28 are designed to light up by turning on LEDs provided inside the browse button 27 and the back button 28.

Incidentally, the browse button 27 bears a mark (which will be referred to as "magnifier mark", hereinafter) 27A on its surface: the magnifier mark 27A uses a magnifying glass as a design motif to imply an image of "Searching." The browse button 27 lights up to emphasize the magnifier mark 27A. Moreover, the back button 28 bears a back mark 28A on its surface: the back mark 28A implies an image of "Reversing." The back button 28 lights up to emphasize the back mark 28A.

When the source button 22 on the front panel 3 is pushed, the vehicle audio video device 1 changes the sources from radio broadcast to CD and the like. The vehicle audio video device 1 outputs the sound of the selected radio broadcast, CD, or the like through the speaker.

When the mode button 23 is pushed during the process of outputting the sound of radio broadcast, the vehicle audio video device 1 switches between AM and FM broadcast, and outputs the sound of the selected AM or FM through the speaker.

When the AMS+button 24 is pushed, for example, during the process of playing a piece of music content from a CD, the vehicle audio video device 1 then starts to play the next piece of music content; when the AMS−button 25 is pushed, the vehicle audio video device 1 then starts to play the previous piece of music content.

Moreover, when the rotary encoder button 26 is rotated in the right direction, the vehicle audio video device 1 turns up the playback volume; when the rotary encoder button 26 is rotated in the left direction, the vehicle audio video device 1 turns down the playback volume.

When the browse button 27 is pushed, the vehicle audio video device 1 starts an application program for browse mode, which is described later, and enters browse mode.

(1-3) Circuit Configuration of Vehicle Audio Video Device

The following describes the circuit configuration of the main body unit 2 and the front panel 3, which constitute the vehicle audio video device 1. Here, not all of the components will be described; mainly, part of the components which is used to operate in after-mentioned browse mode will be described.

Figure 3:
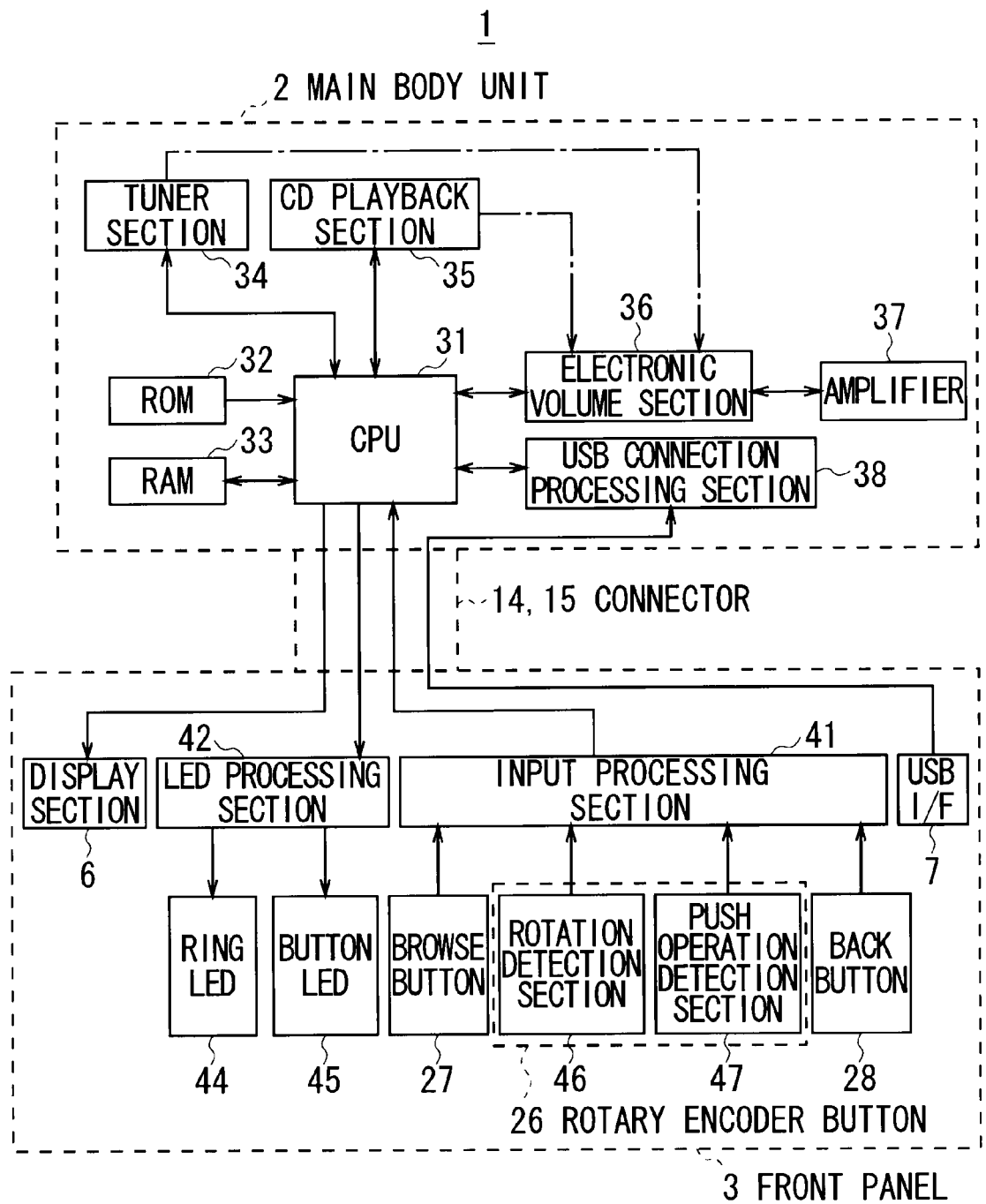
FIG. 3 is a schematic diagram illustrating the circuit configuration of a vehicle audio video device.

As shown in FIG. 3, the main body unit 2 of the vehicle audio video device 1 runs by receiving power-source electric power from a vehicle's battery (not shown). A central processing unit (CPU) 31 reads out a basic program from a read only memory (ROM) 32 and loads it onto a random access memory (RAM) 33. Following the basic program, the CPU 31 takes overall control of the device 1. And following various application programs, the CPU 31 outputs what a tuner section 34 receives, or radio broadcast; the CPU 31 outputs what a CD playback section 35 plays back from a CD, and the like.

The CPU 31 of the vehicle audio video device 1 uses an electronic volume section 36 and an amplifier 37 to amplify the sound of radio broadcast and the sound of played CD to a predetermined level, and then outputs them from the speaker. Moreover, the CPU 31 displays information about the sound of played CD, such as playing time and a music name, on the display section 6 of the front panel 3.

When the browse button 27 and the back button 28 are pushed, an input processing section 41 of the front panel 3 transmits to the CPU 31 a push signal indicating the fact that the browse button 27 and the back button 28 are pushed. When the rotary encoder button 26 is pushed, the input processing section 41 of the front panel 3 transmits to the CPU 31 via a push operation detection section 47 a push signal indicating the fact that the rotary encoder button 26 is pushed.

That allows the CPU 31 of the vehicle audio video device 1 to recognize that the rotary encoder button 26, the browse button 27 and the back button 28 are pushed.

Moreover, the input processing section 41 of the front panel 3 is designed to transmit a right rotation signal to the CPU 31: the right rotation signal is generated by a rotation detection section 46 each time the rotary encoder button 26 is rotated through a predetermined angle in the right direction. The input processing section 41 is designed to transmit a left rotation signal to the CPU 31: the left rotation signal is generated each time the rotary encoder button 26 is rotated through a predetermined angle in the left direction.

That allows the CPU 31 of the vehicle audio video device 1 to recognize that the rotary encoder button 26 is rotated in the right or left direction.

Moreover, the CPU 31 of the vehicle audio video device 1 is designed to light up and blink, using LED processing section 42 of the front panel 3, a ring LED 44 situated inside the ring light 26A (FIG. 2), and a button LED 45 situated inside the browse button 27 and the back button 28.

When connected to, for example, a portable music player via the USB interface 7, the vehicle audio video device 1 is designed to transmit the pieces of music content supplied from the portable music player to the CPU 31 using USB connection processing section 38.

At this time, the CPU 31 of the vehicle audio video device 1 performs a so-called streaming playback in which, while receiving the pieces of music content supplied via the USB interface 7 and the USB connection processing section 38, the CPU 31 plays them at the same time.

(2) Various Modes

Normal playback mode and browse mode will be separately described as part of various modes of the vehicle audio video device 1.

(2-1) Normal Playback Mode

When the CPU 31 of the vehicle audio video device 1 recognizes that the vehicle audio video device 1 starts receiving power-source electric power and operating, or that the source button 22 is pushed, the CPU 31 enters normal playback mode in which it outputs the sound of radio broadcast or CD.

When recognizing that the source button 22 is pushed, the CPU 31 of the vehicle audio video device 1 changes the sources from radio broadcast to CD. If radio broadcast is selected, the CPU 31 outputs the sound of radio broadcast received by the tuner section 34 through the speaker and displays what the tuner section 34 has received, such as a name of radio station, on the display section 6.

If the source button 22 is pushed and CD is selected thereby, the CPU 31 of the vehicle audio video device 1 gets the CD playback section 35 playing a piece of music content from a CD, outputs its sound through the speaker, and displays its music name and the like on the display section 6.

In this manner, the CPU 31 of the vehicle audio video device 1 operates in normal playback mode.

(2-2) Browse Mode

Figure 4:
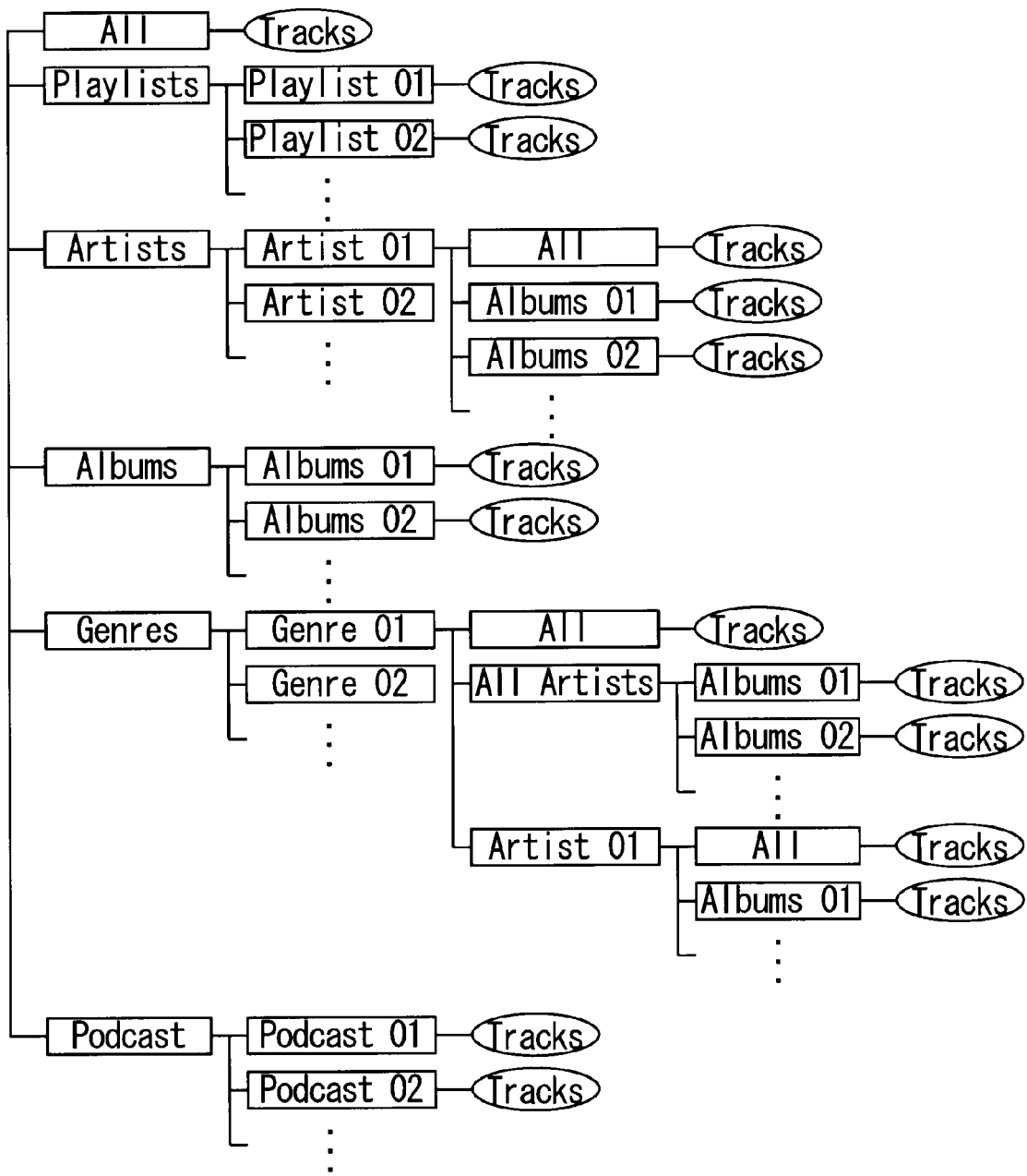
FIG. 4 is a schematic diagram illustrating the configuration of a content list.

After entering browse mode, the vehicle audio video device 1 acquires a content list CL, which is illustrated in FIG. 4, from a portable music player connected through the USB interface 7 and the USB connection processing section 38. The vehicle audio video device 1 allows a user to search the pieces of music content stored in the portable music player through the content list CL.

The content list CL is configured hierarchically. The top stratum of the content list CL provides items to be selected:

"ALL" implying all pieces of music content stored in the portable music player, "Playlists" implying playlists created by a user, "Artists" implying artists, "Albums" implying albums, "Genres" implying genres, "Podcasts" implying pod casts, and the like.

In a stratum beneath Playlist "Playlists" of the content list CL, there are items to select a play list: a first playlist "Playlist01", a second playlist "Playlist02", and the like.

Incidentally, a stratum beneath the first playlist "Playlist01" of the content list CL, there are a plurality of items "Tracks" as music names of the pieces of music content managed and classified under the first playlist "Playlist01."

By the way, the content list CL has various items. In a stratum beneath Artist "Artists", there are a first artist name "Artist01" and a second artist name "Artist02." In a stratum beneath Albums "Albums", there are a first album name "Album01" and a second album name "Album02." In a stratum beneath Genre "Genres", there are a first genre name "Genre01" and a second genre name "Genre02." In a stratum beneath Podcast "Podcast", there are a first podcast name "Podcast01" and a second podcast name "Podcast02."

Incidentally, before entering browse mode, the CPU 31 of the vehicle audio video device 1 allows a user to choose one of display methods as to how the items of the content list CL are displayed on the display section 6: one-line displaying or plurality-of-line displaying. The following describes a case in which the plurality-of-line displaying, or three-line displaying, is selected, for example.

Figure 5:
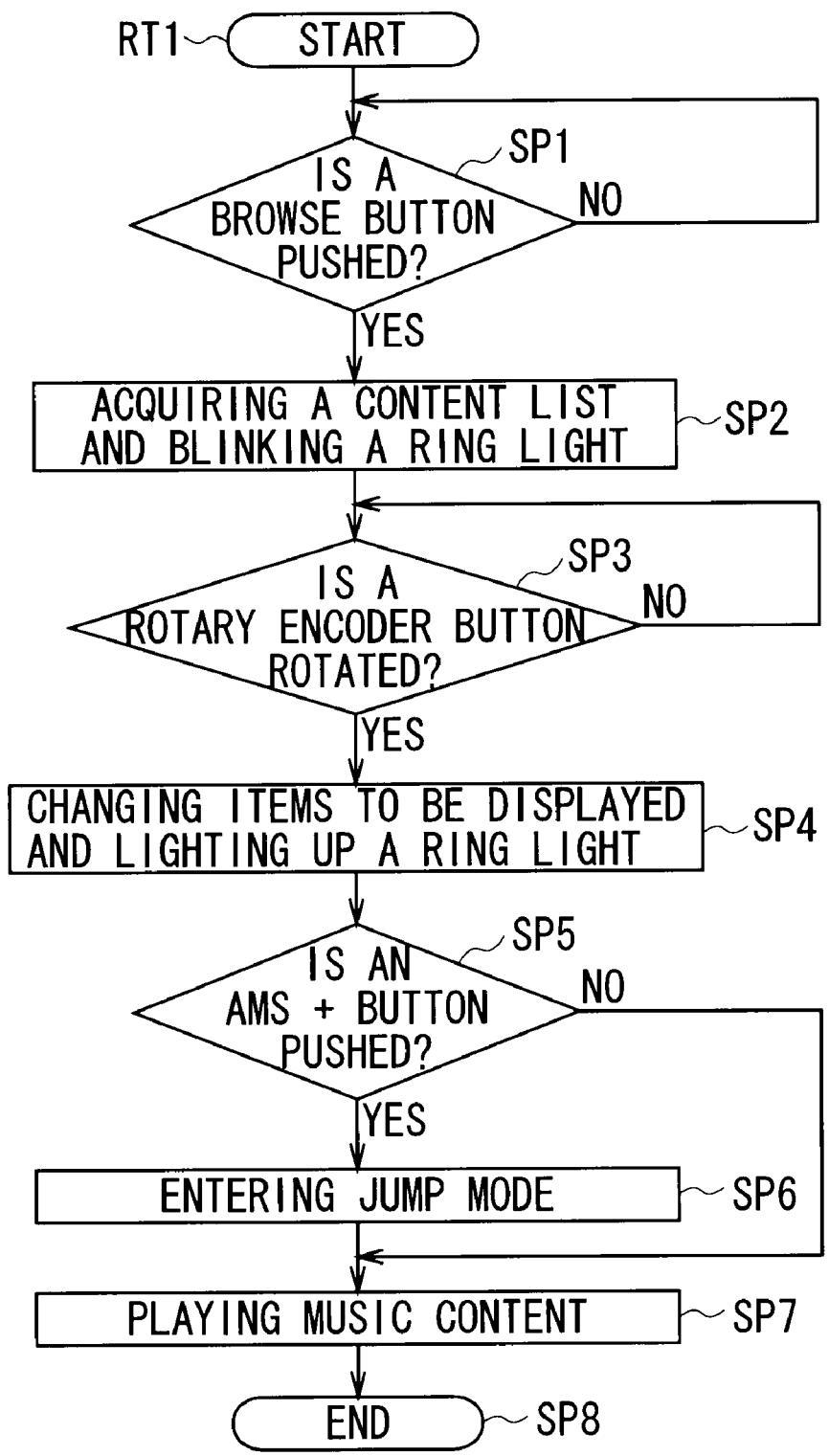
FIG. 5 is a flowchart illustrating the procedure of the process of music content search and illumination guidance in browse mode.

In the actual case, before entering browse mode, the CPU 31 of the vehicle audio video device 1 performs browse mode's music content searching process and illumination guidance process as shown in FIG. 5, enters start step of a routine RT1, and then proceeds to step SP1.

At step SP1, the CPU 31 of the vehicle audio video device 1 makes a determination as to whether the browse button 27 of the front panel 3 is pushed. If the negative result is obtained, the CPU 31 returns to step SP1 and waits until the browse button 27 is pushed again. Whereas if the affirmative result is obtained, the CPU 31 proceeds to next step SP2.

At step SP2, the CPU 31 of the vehicle audio video device 1 acquires the content list CL (FIG. 4) from the portable music player connected via the USB interface 7 and the USB connection processing section 38, stores the content list CL in the RAM 33, blinks the ring LED 44 through the LED processing section 42 to blink the ring light 26A situated around the rotary encoder button 26, and then proceeds to next step SP3.

Therefore, the vehicle audio video device 1 can visually inform a user that what the user should do next is to operate the rotary encoder button 26, and thereby prompt the user to operate the rotary encoder button 26.

At step SP3, the CPU 31 of the vehicle audio video device 1 makes a determination as to whether the rotary encoder button 26 is rotated. If the negative result is obtained, the CPU 31 returns to step SP3 and waits until the rotary encoder button 26 is operated again. If the affirmative result is obtained, the CPU 31 proceeds to next step SP4.

At step SP4, the CPU 31 of the vehicle audio video device 1 changes the items of the content list CL to be displayed on the display section 6 in accordance with the rotation of the rotary encoder button 26, while lighting up the ring LED 44 through the LED processing section 42 to light up the ring light 26A, and then proceeds to next step SP5.

At step SP4, the CPU 31 of the vehicle audio video device 1 produces a selection screen TG1 as shown in FIG. 6A: the selection screen TG1 includes a browse icon BI implying "Search", a three-line displaying area TA displaying the items of the top stratum of the content list CL stored in the RAM 33, such as Artist "Artists", Album "Albums", and Genre "Genres", and a selection cursor CL used for selecting the items around the center of the three-line displaying area TA. The CPU 31 then displays the selection screen TG1 on the display section 6.

By the way, the CPU 31 of the vehicle audio video device 1 is designed to sequentially scroll the items to be displayed on the three-line displaying area TA from the bottom to the top each time it receives a right rotation signal via the rotation detection section 46 and the input processing section 41 after the rotary encoder button 26 is rotated in the right direction.

Moreover, the CPU 31 of the vehicle audio video device 1 is designed to sequentially scroll the items to be displayed on the three-line displaying area TA from the top to the bottom each time it receives a left rotation signal via the rotation detection section 46 and the input processing section 41 after the rotary encoder button 26 is rotated in the left direction.

When recognizing that, with the selection cursor CS put on Album "Albums" on the selection screen TG1 (FIG. 6A), the rotary encoder button 26 is pushed, the CPU 31 of the vehicle audio video device 1 displays the stratum beneath Album "Albums" on the three-line displaying area TA.

At this time, the CPU 31 of the vehicle audio video device 1 produces an album selection screen TG2 and displays the album selection screen TG2 on the display section 6: the album selection screen TG2 includes, as shown in FIG. 6B, the browse icon BI, the three-line displaying area TA displaying the items of the stratum beneath Album "Albums" of the content list CL, such as a ninth album name "Album09", a first album name "Album01", and a second album name "Album02", and the selection cursor CL.

When recognizing that, with the selection cursor CS put on the first album name "Album01" on the album selection screen TG2, the rotary encoder button 26 is pushed, the CPU 31 of the vehicle audio video device 1 displays the stratum beneath the first "Album 01" on the three-line displaying area TA.

At this time, the CPU 31 of the vehicle audio video device 1 produces an music selection screen TG3 and displays the music selection screen TG3 on the display section 6: the music selection screen TG3 includes, as shown in FIG. 6C, the browse icon BI, the three-line displaying area TA displaying the items of the stratum beneath the first album name "Album01" of the content list CL, such as a music name "Track1000", a music name "Track01", and a music name "Track02", and the selection cursor CL.

At step SP5 (FIG. 5), the CPU 31 of the vehicle audio video device 1 makes a determination as to whether the AMS+button 24 is pushed: the AMS+button 24 is used to enter after-mentioned jump mode from browse mode. If the negative result is obtained, the CPU 31 proceeds to SP7. Whereas if the affirmative result is obtained, the CPU 31 proceeds to next step SP6.

At step SP6, the CPU 31 of the vehicle audio video device 1 enters jump mode after the AMS+button 24 is pushed, and then proceeds to step SP7.

At step SP7, when recognizing that, with the music selection screen TG3 (FIG. 6C) being displayed on the display section 6, the AMS+button 24 of the front panel 3 is pushed, the CPU 31 of the vehicle audio video device 1 first generates a jump mode screen TG4 and displays the jump mode screen TG4 on the display section 6: as shown in FIG. 6D, the jump mode screen TG4 includes the above-noted browse icon BI, a jump mode notification area JM, a number-of-jumping display area JN, and a side bar SB.

Here, the jump mode notification area JM displays "Jump Mode" to allow a user to visually recognize that it is in jump mode and to inform a user that it is in jump mode. Moreover, the number-of-jumping display area JN displays "1000", or the total number of items that exist in a stratum displayed on the three-line displaying area TA of the music selection screen TG3, as a denominator (which will be referred to as "total item number", hereinafter), and "1", or the number of items which is going to be skipped within the stratum, as a numerator (which will be referred to as "jump number", hereinafter). Furthermore, the side bar SB displays a location display mark PM to allow a user to visually check where the jump number is with respect to the total item number, and moves the location display mark PM in accordance with the jump number.

Figure 6:
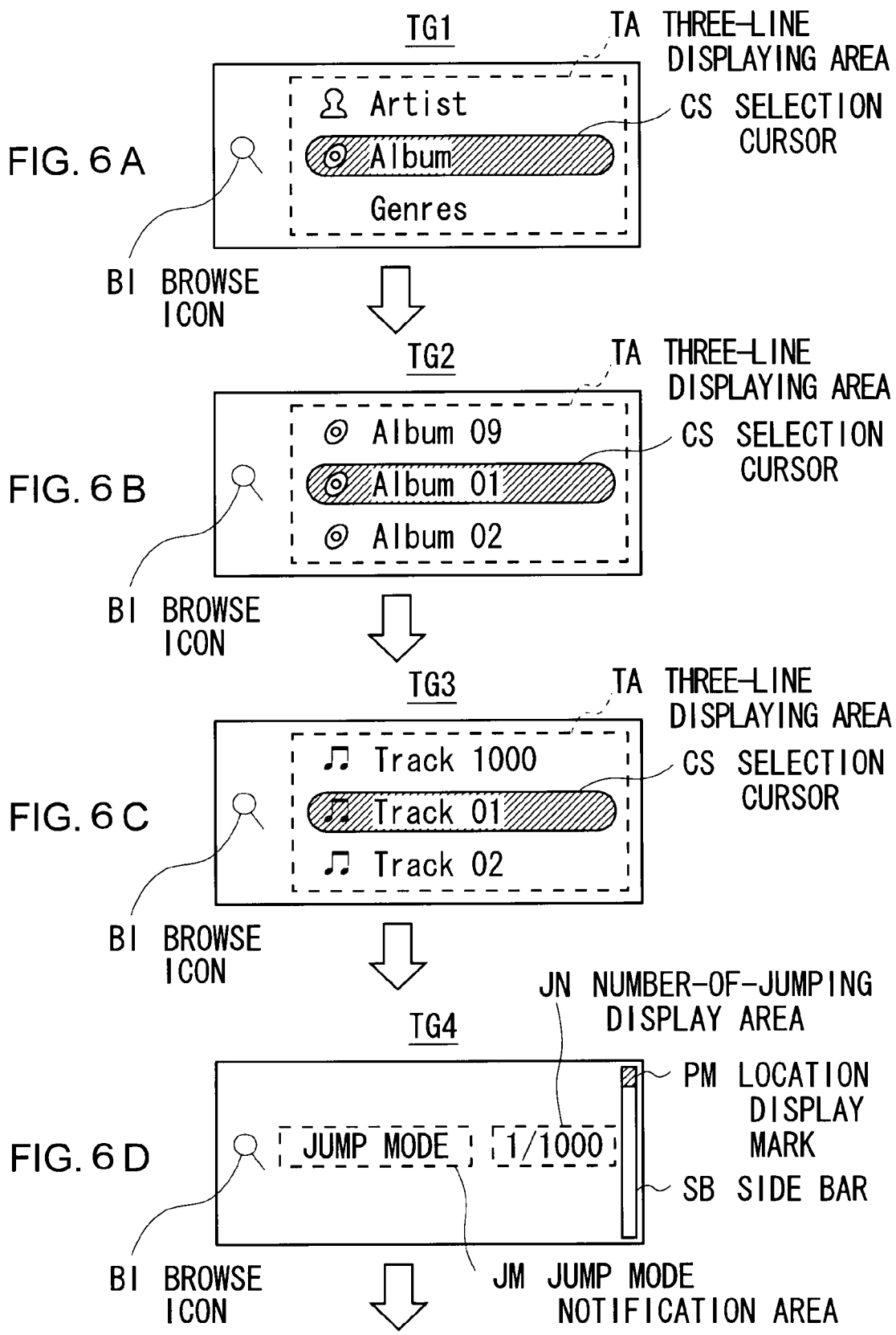
FIGS. 6A to 6D are schematic diagrams illustrating a displayed screen (1) for three-line displaying.
Figure 7:
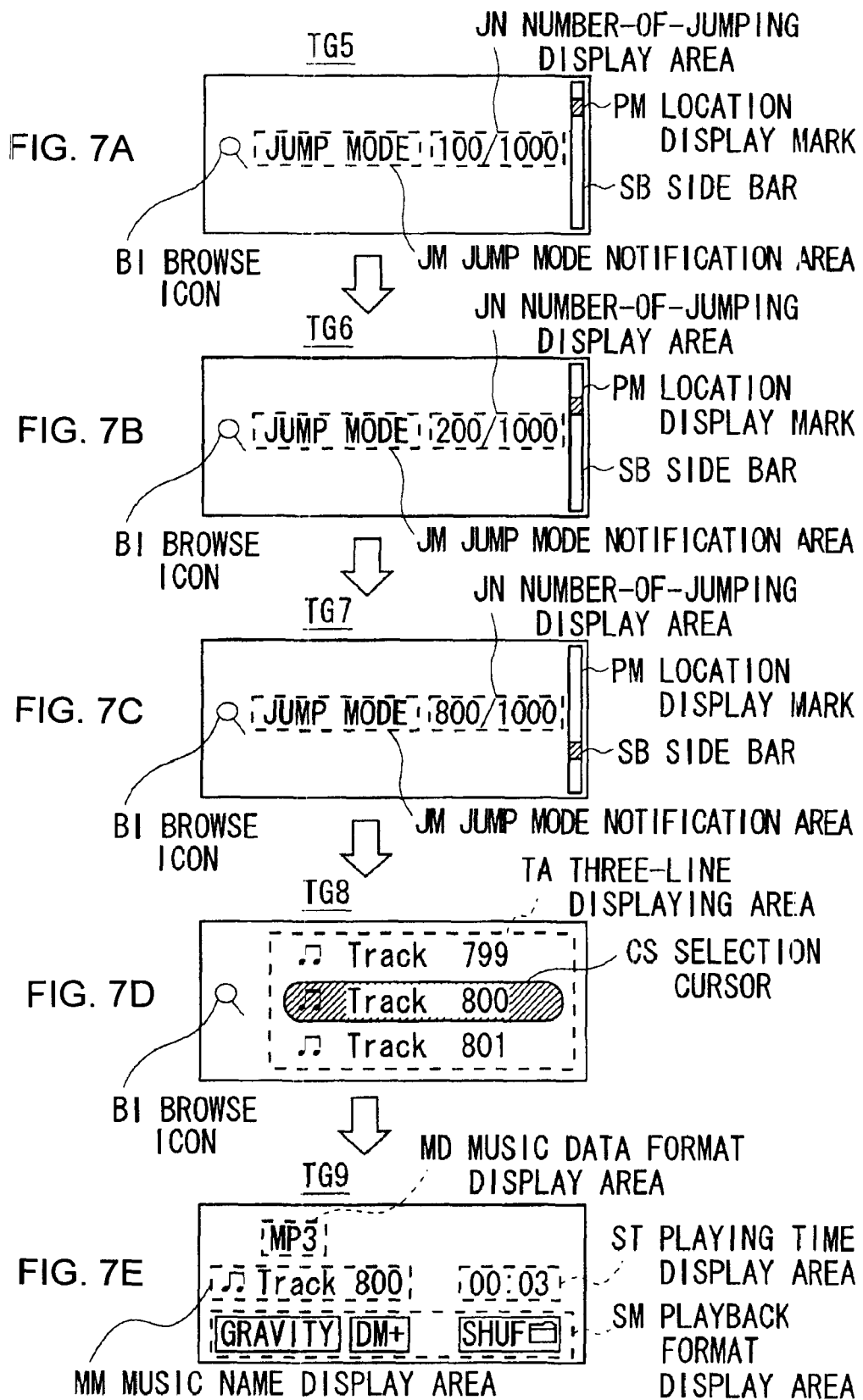
FIGS. 7A to 7E are schematic diagrams illustrating a displayed screen (2) for three-line displaying.

And, as shown in FIG. 7A following FIG. 6, when the rotary encoder button 26 is rotated in the right direction with the display section 6 displaying the jump mode screen TG4 (FIG. 6D), the CPU 31 of the vehicle audio video device 1 receives a right rotation signal via the rotation detection section 46 and the input processing section 41, generates a jump mode screen TG5 whose jump number is "100" which is equivalent to 10 percent of the total item number "1000", and displays the jump mode screen TG5 on the display section 6.

As shown in FIG. 7B, when the rotary encoder button 26 is rotated in the right direction with the display section 6 displaying the jump mode screen TG5 (FIG. 7A), the CPU 31 of the vehicle audio video device 1 receives a right rotation signal via the rotation detection section 46 and the input processing section 41 again, generates a jump mode screen TG6 whose jump number is "200" which is equivalent to 20 percent of the total item number "1000", and displays the jump mode screen TG6 on the display section 6.

In this manner, each time the CPU 31 of the vehicle audio video device 1 receives a right rotation signal via the rotation detection section 46 and the input processing section 41 after the rotary encoder button 26 is rotated in the right direction, the CPU 31 increases the jump number by an amount equivalent to 10 percent of the total item number, and displays the number-of-jumping display area JN showing this jump number on the display section 6.

On the other hand, when the rotary encoder button 26 is rotated in the left direction with the display section 6 displaying the jump mode screen TG6 (FIG. 7B), the CPU 31 of the vehicle audio video device 1 receives a left rotation signal via the rotation detection section 46 and the input processing section 41, generates a jump mode screen TG5 (FIG. 7A) whose jump number is "100" which is equivalent to 10 percent of the total item number "1000", and displays the jump mode screen TG5 on the display section 6.

Accordingly, each time the CPU 31 of the vehicle audio video device 1 receives a left rotation signal via the rotation detection section 46 and the input processing section 41 after the rotary encoder button 26 is rotated in the left direction, the CPU 31 decreases the jump number by an amount equivalent to 10 percent of the total item number, and displays the number-of-jumping display area JN showing this jump number on the display section 6.

When recognizing, after the rotary encoder 26 is rotated in the right direction and the a jump mode screen TG7 (FIG. 7C) whose number-of-jumping display area JN is showing "800/1000" is for example displayed, that the rotary encoder button 26 is pushed, the CPU 31 of the vehicle audio video device 1 moves to items corresponding to the jump number "800", generates a music selection screen TG8 (FIG. 7D) whose three-line displaying area TA shows a music name "Track799", a music name "Track800", and a music name "Track801", and displays the music selection screen TG8 on the display section 6.

At step SP7 (FIG. 5), the CPU 31 of the vehicle audio video device 1 receives a piece of music content of the music name "Track800" selected by a user from the portable music player, plays the piece of music content, and proceeds to step SP8 to end the process.

At step SP7, when recognizing that, with the selection cursor SC put on the music name "Track800" on the music selection screen TG8 (FIG. 7D), the rotary encoder button 26 is pushed, the CPU 31 of the vehicle audio video device 1 performs a streaming playback in which the CPU 31 receives the piece of music content of the music name "Track800" from the portable music player connected via the USB interface 7 and the USB connection processing section 38, amplifies the sound of the piece of music content to a predetermined level using the electronic volume section 36 and the amplifier 37, and then outputs the amplified sound from the speaker.

At this time, as shown in FIG. 7E, the CPU 31 of the vehicle audio video device 1 generates a music playback screen TG9 and displays the music playback screen TG9 on the display section 6 while performing the streaming playback of the piece of music content of the music name "Track800": the music playback screen TG9 includes a music data format display area MD that displays a data format "mp3" of the piece of music content, a music name display area MM that displays the music name "Track800" of the piece of music content, a playing time display area ST that displays a playing time "00:03" of the piece of music content, and a playback format display area SM that displays a playback format for the piece of music content, or, for example, one of equalizer's modes such as "GRAVITY", Codec Enhancer "DM+", and "SHUF".

In this manner, when the browse button 27 is pushed, the vehicle audio video device 1 enters browse mode and blinks the ring light 26A to visually inform that the next operation should be performed on the rotary encoder button 26. When the rotary encoder button 26 is rotated, the vehicle audio video device 1 lights up the ring light 26A, thereby stopping the prompting for the operation of the rotary encoder 26 and informing that the rotary encoder button 26 is being operated.

And the vehicle audio video device 1 displays three lines of items of the content list CL on the display section 6, and encourages a user to push the rotary encoder button 26 to move from the upper strata to lower strata of the content list CL to search. This allows a user to search the pieces of music content stored in the portable music player through the vehicle audio video device 1.

Moreover, since the vehicle audio video device 1 acquires from the portable music player the content list CL that is used for searching the pieces of music content, the vehicle audio video device 1 does not have to force the portable music player to produce a new content list CL. In addition, the vehicle audio video device 1 does not have to create a new content list CL. By using the acquired content list CL in browse mode, the vehicle audio video device 1 can provide the same kind of searching method as that of the portable music player to a user via the display section 6 of the front panel 3.

Furthermore, when the AMS+button 24 is pushed, the CPU 31 of the vehicle audio video device 1 enters jump mode in which, if there are many items at a certain stratum, after skipping a certain amount of items based on a predetermined ratio, searching can be done by rotating the rotary encoder 26. Accordingly, even the minimum rotation of the rotary encoder button 26 makes it possible to search for desired items (music names).

By the way, when recognizing that, for example, with the music selection screen TG3 (FIG. 6C) being displayed on the display section 6, the back button 28 is pushed, the CPU 31 of the vehicle audio video device 1 generates the album selection screen TG2 (FIG. 6B) again, and displays the album selection screen TG2 on the display section 6.

In this manner, when the back button 28 is pushed, the CPU 31 of the vehicle audio video device 1 displays the items of the upper strata of the content list CL instead of those of the lower strata on the three-line displaying area TA.

Figure 8:
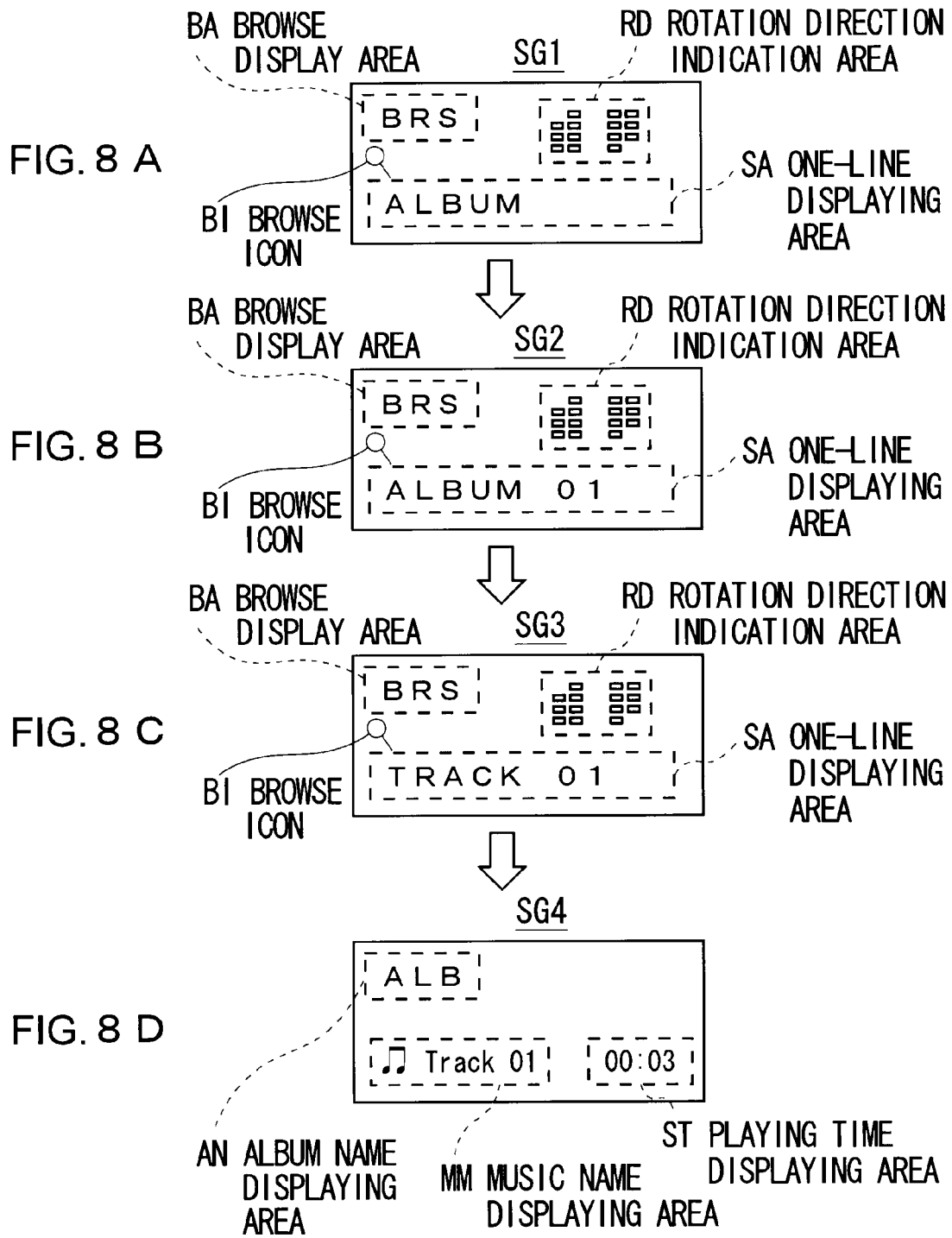
FIGS. 8A to 8D are schematic diagrams illustrating a displayed screen for one-line displaying.
Figure 9:
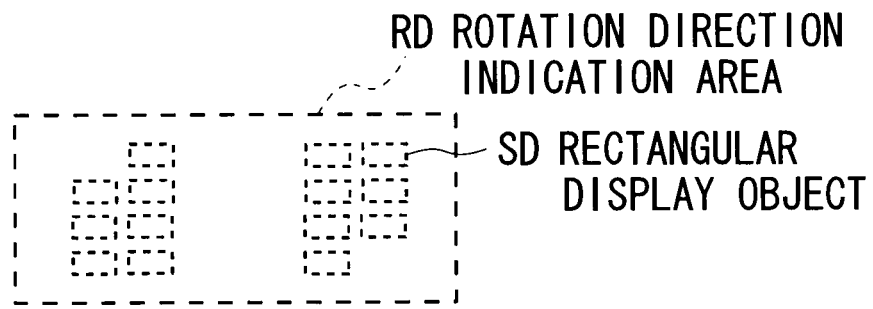
FIGS. 9A to 9E are schematic diagrams illustrating what a one-line displaying rotation direction indication area displays for indicating right-hand rotation.
Figure 9:
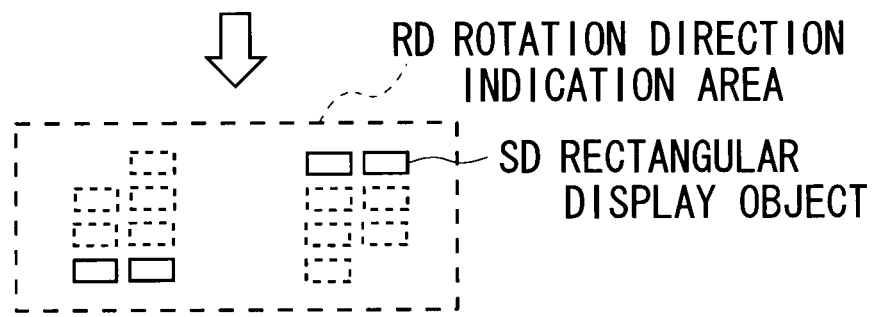
Figure 9:
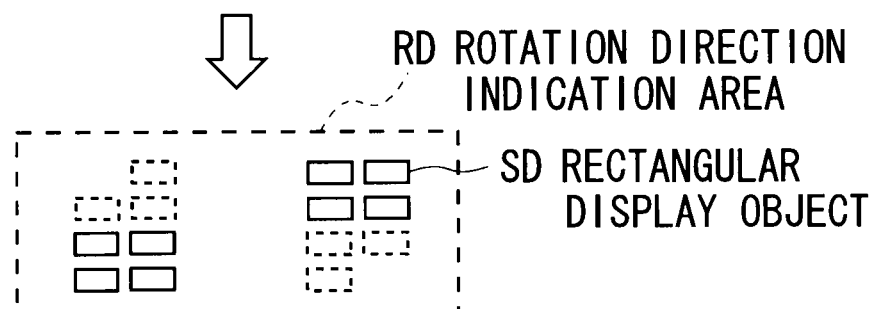
Figure 9:
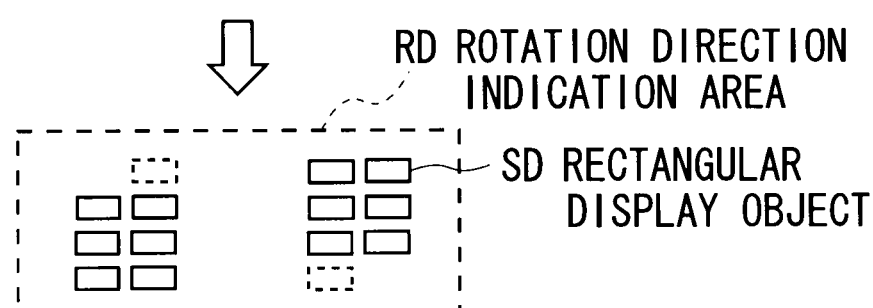
Figure 9:
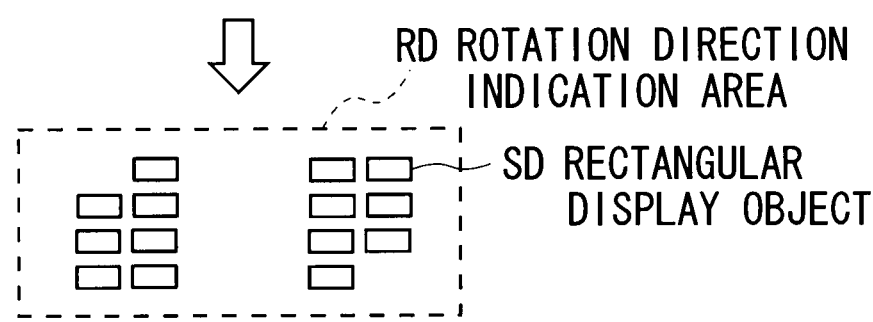

By the way, as shown in FIG. 8A, if a user previously selects one-line displaying, the CPU 31 of the vehicle audio video device 1 generates a selection screen SG1 and displays the selection screen SG1 on the display section 6 after recognizing that the browse button 27 is pushed and acquiring the content list CL from the portable music player: the selection screen SG1 includes a browse icon BI, a browse display area BA that displays "BRS" to inform that it is in browse mode, a one-line displaying area SA that for example displays "Albums" which is the item of the top stratum of the content list CL stored in the RAM 33, and a rotation direction indication area RD that allows a user to visually check the direction of rotation of the rotary encoder button 26.

And, each time the CPU 31 of the vehicle audio video device 1 receives a right rotation signal via the rotation detection section 46 and the input processing section 41 after the rotary encoder button 26 is rotated in the right direction, the CPU 31 selects the item of the lower stratum instead of that of the upper stratum from the content list CL, and displays the selected one item on the one-line displaying area SA.

And, each time the CPU 31 of the vehicle audio video device 1 receives a left rotation signal via the rotation detection section 46 and the input processing section 41 after the rotary encoder button 26 is rotated in the left direction, the CPU 31 selects the item of the upper stratum instead of that of the lower stratum from the content list CL, and displays the selected one item on the one-line displaying area SA.

When recognizing that, with the one-line displaying area SA of the selection screen SG1 (FIG. 8A) displaying Album "Albums", the rotary encoder button 26 is pushed, the CPU 31 of the vehicle audio video device 1 displays an item of the stratum beneath Album "Albums" instead of Album "Albums" on the one-line displaying area SA.

At this time, as shown in FIG. 8B, the CPU 31 of the vehicle audio video device 1 generates an album selection screen SG2, and displays the album selection screen SG2 on the display section 6: the album selection screen SG2 includes a browse icon BI, a browse display area BA, a one-line display area SA that displays a first album name "Album01" which is one of the items of the stratum beneath Album "Albums" in the content list CL, and a rotation direction instruction area RD.

When recognizing that, with the one-line displaying area SA of the album selection screen SG2 displaying the first album name "Album01", the rotary encoder button 26 is pushed, the CPU 31 of the vehicle audio video device 1 displays an item of the stratum beneath the first album name "Album01" instead of the first album name "Album01" on the one-line displaying area SA.

At this time, as shown in FIG. 8C, the CPU 31 of the vehicle audio video device 1 generates an album selection screen SG3, and displays the album selection screen SG3 on the display section 6: the album selection screen SG3 includes a browse icon BI, a browse display area BA, a one-line display area SA that displays a music name "Track01" which is one of the items of the stratum beneath the first album name "Album01" in the content list CL, and a rotation direction instruction area RD.

When recognizing that, with the one-line displaying area SA of the music selection screen SG3 displaying the music name "Track01" the rotary encoder button 26 is pushed, the CPU 31 of the vehicle audio video device 1 performs a streaming playback in which the CPU 31 receives the piece of music content of the music name "Track01" from the portable music player connected via the USB interface 7 and the USB connection processing section 38, amplifies the sound of the piece of music content to a predetermined level using the electronic volume section 36 and the amplifier 37, and then outputs the amplified sound from the speaker.

At this time, as shown in FIG. 8D, the CPU 31 of the vehicle audio video device 1 generates a music playback screen SG4 and displays the music playback screen SG4 on the display section 6 while performing the streaming playback of the piece of music content: the music playback screen SG4 includes an album name displaying area AN that displays an album name of the piece of music content, a music name displaying area MM that displays a music name "Track01" of the piece of music content, and a playing time displaying area ST that displays a playing time "00:03" of the sound of the piece of music content.

Here, the rotation direction indication area RD will be described. The CPU 31 of the vehicle audio video device 1 running in one-line displaying mode is designed to display the rotation direction indication area RD on the selection screen SG1 (FIG. 8A) the album selection screen SG2 (FIG. 8B), and the music selection screen SG3 (FIG. 8C).

As shown in FIGS. 9A to 9E, when receiving a right rotation signal via the rotation detection section 46 and the input processing section 41 after the rotary encoder button 26 is for example rotated in the right direction with the display section 6 displaying the selection screen SG1, the album selection screen SG2 and the music selection screen SG3, the CPU 31 of the vehicle audio video device 1 for example displays 7 rectangular display objects SD on the right side of the rotation direction indication area RD and 7 rectangular display objects SD on the left side of the rotation direction indication area RD, and changes these rectangular display objects SD over time.

Specifically, as for the 7 rectangular display objects SD on the left side, the CPU 31 of the vehicle audio video device 1 incrementally displays them from the bottom to the top, increasing the number of the objects by two each time (and by one at the last time); as for the 7 rectangular display objects SD on the right side, the CPU 31 of the vehicle audio video device 1 incrementally displays them from the top to the bottom, increasing the number of the objects by two each time (and by one at the last time). The number of the rectangular display objects SD increases over time.

In this manner, by changing the rectangular display objects SD displayed on the rotation direction indication area RD over time, the CPU 31 of the vehicle audio video device 1 can visually inform a user that the rotary encoder button 26 is rotated in the right direction.

By the way, if the rotary encoder button 26 is rotated in the left direction, the CPU 31 of the vehicle audio video device 1 is designed to change the rectangular display objects SD displayed on the rotation direction indication area RD over time in the opposite way to the case in which the above-noted rotary encoder button 26 is rotated in the right direction.

(3) Operation and Effect

In the above-noted configuration, when the browse button 27 is pushed, the CPU 31 of the vehicle audio video device 1 enters browse mode, and acquires the content list CL from the portable music player via the USB interface 7 and the USB connection processing section 38. Therefore, the CPU 31 of the vehicle audio video device 1 can provide a user with the searching method that uses the content list CL, and thereby provide a user with the same kind of searching method as that of the portable music player.

Moreover, when the browse button 27 is pushed, the CPU 31 of the vehicle audio video device 1 blinks the ring light 26A through the LED processing section 42 and the ring LED 44 to visually inform a user that the next operation should be done on the rotary encoder button 26. Therefore, the CPU 31 of the vehicle audio video device 1 can prompt the user to operate the rotary encoder button 26.

Furthermore, when the browse button 27 is pushed, the CPU 31 of the vehicle audio video device 1 generates the selection screens TG1 and SG1 (FIG. 6A and FIG. 8A) that display the browse icon BI which informs a user that a searching process is being performed and allows the user to visually check that a searching process is being performed, the items of the top stratum of the content list CL, and the like. The CPU 31 of the vehicle audio video device 1 displays the selection screens TG1 and SG1 on the display section 6. Therefore, the CPU 31 can inform the user that it is searching the pieces of music content stored in the portable music player.

Moreover, as the rotary encoder button 26 is rotated, the CPU 31 of the vehicle audio video device 1 changes the content list CL's items to be displayed on the display section 6; when the rotary encoder button 26 is pushed, the CPU 31 displays items of a stratum beneath the item selected by the selection cursor CS of three-line displaying, or an item of a stratum beneath the item that was displayed on the one-line displaying area SA of one-line displaying, and encourages a user to repeat that operation. Accordingly, the CPU 31 of the vehicle audio video device 1 allows the user to search for his/her desired piece of music content by moving from the top to bottom strata of the content list CL.

In this manner, the vehicle audio video device 1 is equipped with the rotary encoder button 26, the browse button 27 and the back button 28, and allows a user to push the browse button 27 to which the magnifier mark 27A implying an image of "Searching" is attached before starting browse mode.

Subsequently, the vehicle audio video device 1 blinks the ring light 26A to prompt a user to operate the rotary encoder button 26, and lets the user rotate and push the rotary encoder button 26 to move from the top to bottom strata of the content list CL to search for his/her desired piece of music content.

Accordingly, by letting a user understand the next operation during the process of searching for his/her desired piece of music content with the help of the content list CL, the vehicle audio video device 1 enables the display section 6 of the front panel 3, the rotary encoder button 26, the browse button 27 and the back button 28 to work in cooperation with one another as a so-called intuitive interface, and allows a user to unknowingly understand how to operate.

Furthermore, the CPU 31 of the vehicle audio video device 1 running in browse mode enters jump mode after the AMS+ button 24 is pushed. Accordingly, if there are many items at a certain stratum, after skipping the items by a certain amount of jumping corresponding to the predetermined ratio to the lower direction, the process of searching can be done by the rotation of the rotary encoder button 26. Accordingly, even the minimum rotation of the rotary encoder button 26 makes it possible to search for desired items (music names).

Moreover, in the vehicle audio video device 1, the browse button 27 and the back button 28 are provided in a space between the rotary encoder button 26 of the front panel 3 and the driver's seat. Accordingly, a user does not have to look for the rotary encoder button 26, the browse button 27 and the back button 28 for the browse mode's operation, and can easily feel around for them. Accordingly, the operability for users further improves, and its safety level further improves.

According to the above configuration, the browse button 27 and the back button 28 are provided in a space between the rotary encoder button 26 of the front panel 3 and the driver's seat; when searching the pieces of music content stored in the portable music player that is an external device, a user can intuitively and unknowingly understand the operation method. Therefore, the operability for users who are searching the pieces of music content stored in the external device is good.

(4) Other Embodiments

Figure 10:
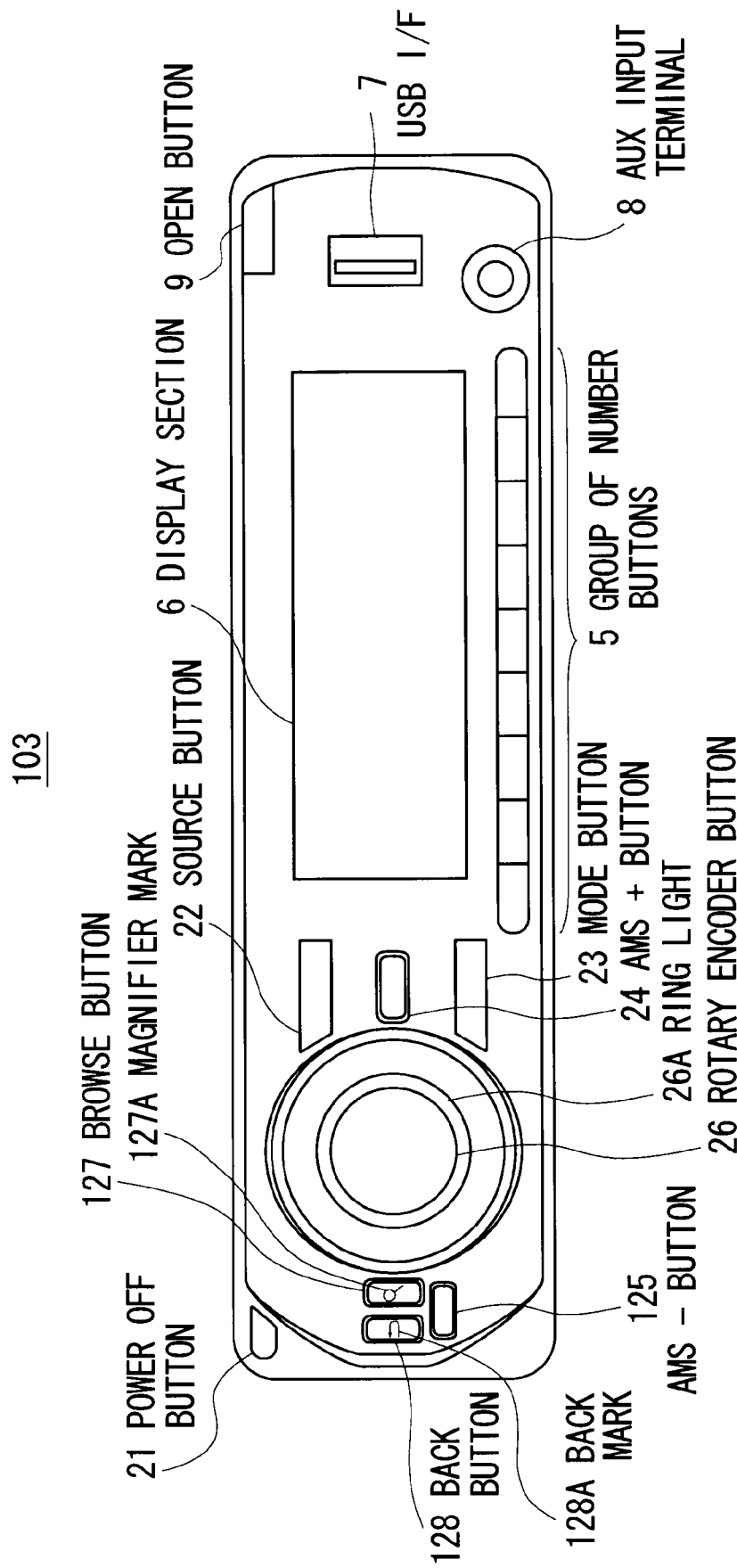
FIG. 10 is a schematic diagram illustrating the appearance configuration of a front panel (1) according to another embodiment of the present invention.

By the way, in the above-noted embodiment, as the appearance configuration of the front panel 3, the browse button 27 is placed at the upper left side of the rotary encoder button 26, and the back button 28 is placed at the lower left side of the rotary encoder button 26. However, the present invention is not limited to this. As shown in FIG. 10 whose parts have been designated by the same symbols as the corresponding parts of FIG. 2, as the appearance configuration of a front panel 103, a browse button 127 and a back button 128 may be horizontally arranged on the left side of the rotary encoder button 26.

That is, as long as the browse button 127 and the back button 128 are provided in a space between the rotary encoder button 26 of the front panel 103 and the driver's seat, this can offer the same effect as the above-noted embodiment. Incidentally, on the front panel 103, an AMS–button 125 is provided below the browse button 127 and the back button 128.

Figure 11:
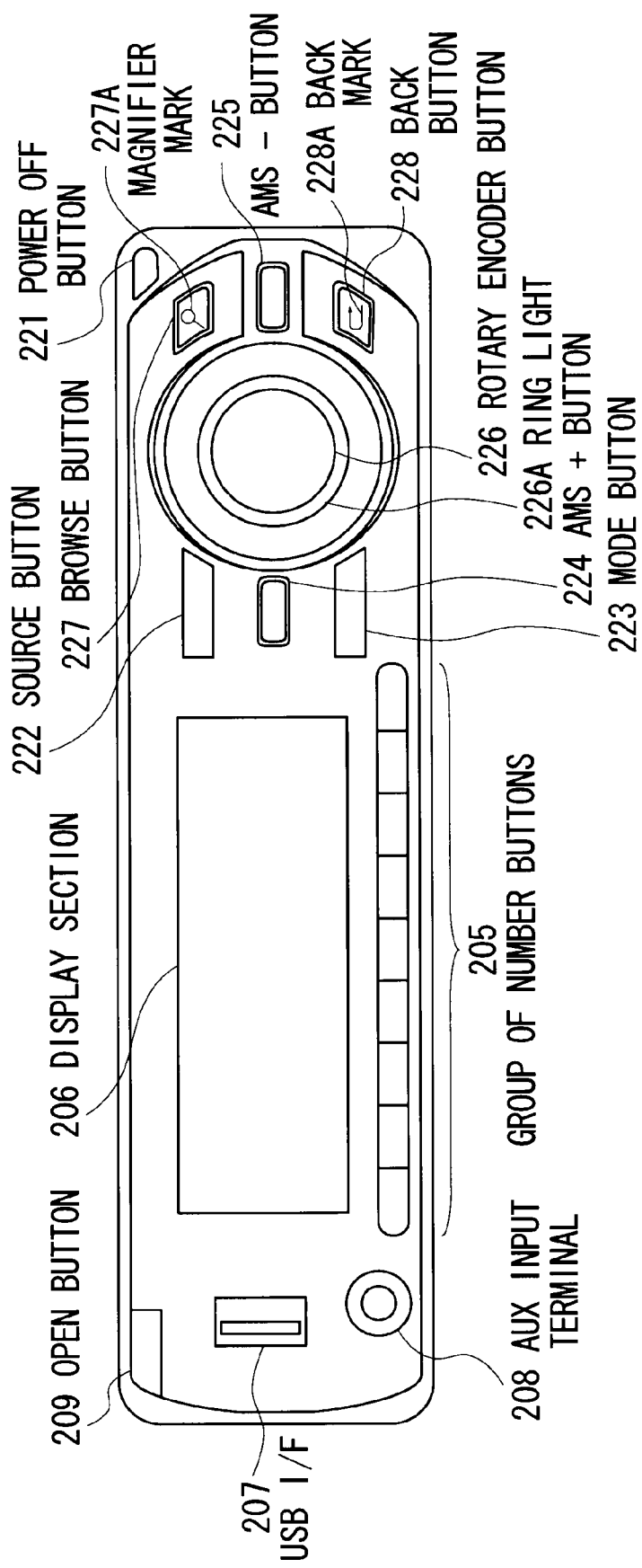
FIG. 11 is a schematic diagram illustrating the appearance configuration of a front panel (2) according to another embodiment of the present invention.
Figure 1:
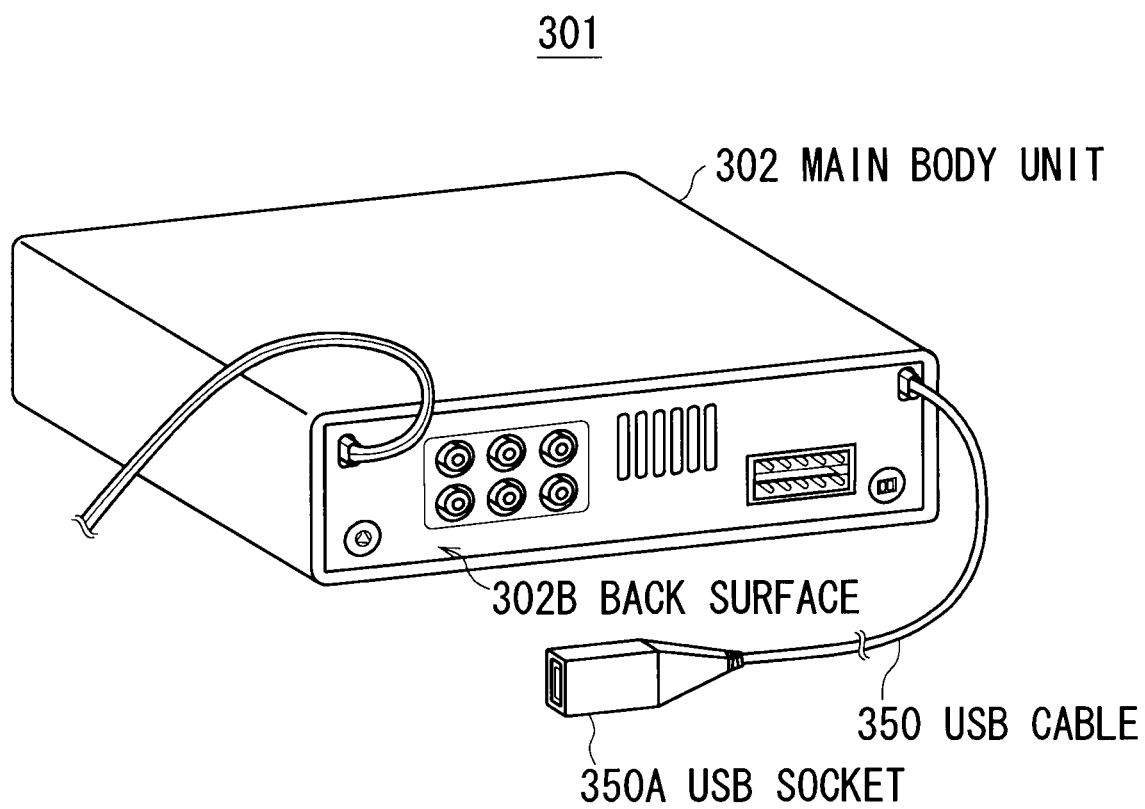
Figure 1:
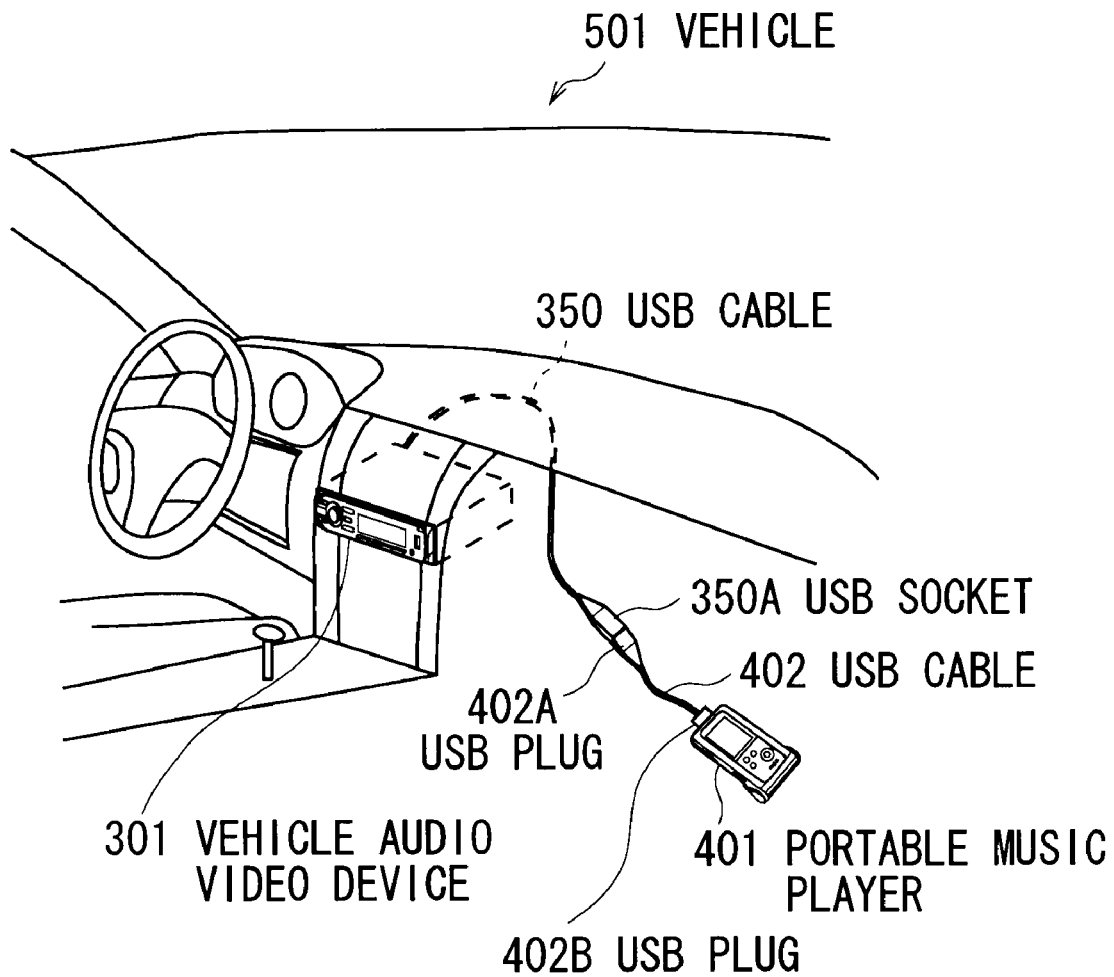

Moreover, in the above-noted embodiment, if the driver's seat is situated on the left side of the vehicle, the front panel 3 is applied. However the present invention is not limited to this. As shown in FIG. 11 whose parts have been designated by the same symbols as the corresponding parts of FIG. 2, if the driver's seat is situated on the right side of the vehicle, a front panel 203, where a browse button 227 and a back button 228 are provided in a space between an encoder 226 of the front panel 203 and the driver's seat, can be applied.

That is, as long as the browse button 227 and the back button 228 are provided in a space between the rotary encoder 226 of the front panel 203 and the driver's seat, this can offer the same effect as the above-noted embodiment.

Furthermore, in the above-noted embodiment, the portable music player is connected via the USB interface 7 of the front panel 3. However, the present invention is not limited to this. As shown in FIG. 12, to a vehicle audio video device 301 whose main body unit 302's back surface 302B is equipped with a USB cable 350 one end of which is equipped with a USB socket 350A, the portable music player can be connected via the USB cable 350 and the USB socket 350A.

In this case, as shown in FIG. 13, the vehicle audio video device 301 is situated inside a dashboard of a vehicle 501, and the USB socket 350A connected to one end of the USB cable 350 is exposed outside into a room of the vehicle 501.

By connecting the USB socket 350A connected to one end of the USB cable 350 and a USB plug 402A connected to one end of a USB cable 402, and a USB plug 402B connected to the other end of the USB cable 402 and a portable music player 401, the vehicle audio video device 301 is connected to the portable music player 401 via the USB cable 350 and the USB cable 402.

Furthermore, in the above-noted embodiment, in browse mode, the pieces of music content stored in the portable music player connected via the USB interface 7 and the USB connection processing section 38 are searched. However, the present is not limited to this. Instead, the pieces of music content stored in a USB memory connected via the USB interface 7 and the USB connection processing section 38, and the pieces of music content stored in a CD inserted via the disc slot 13 may be searched.

Furthermore, in the above-noted embodiment, in browse mode, the pieces of music content stored in the portable music player connected via the USB interface 7 and the USB connection processing section 38 are searched. However, the present is not limited to this. Instead, motion-picture content, image content, or the like stored in the portable music player may be searched.

In this case, for example, the CPU 31 of the vehicle audio video device 1 may display on the display section 6 thumbnail images as items of motion-picture content in the lower strata to allow a user to search the pieces of motion-picture content.

Furthermore, in the above-noted embodiment, in browse mode, the pieces of music content stored in the portable music player connected via the USB interface 7 and the USB connection processing section 38 are searched. However, the present is not limited to this. During the process of browse mode, music content can be searched from devices other than the portable music player.

In this case, when the CPU 31 of the vehicle audio video device 1 running in browse mode recognizes that for example the source button 22 is pushed, the CPU 31 acquires a content list listing pieces of music content of a CD from the CD, and stores the acquired content list in the RAM 33. Subsequently, the CPU 31 of the vehicle audio video device 1 displays on the display section 6 items of the content list stored in the RAM 33, and thereby allows a user to search for the pieces of music content of the CD.

Furthermore, in the above-noted embodiment, in browse mode, the pieces of music content stored in the portable music player connected via the USB interface 7 and the USB connection processing section 38 are searched. However, the present is not limited to this. For example, during the process of browse mode, not only those of the portable music player but music content and video content stored in an internal storage (such as a hard disk drive (not shown)) of the vehicle audio video device 1, or in CD, digital versatile disc (DVD) and the like inserted into a media player (not shown) that can play CD, DVD and the like may be searched.

Furthermore, in the above-noted embodiment, when the AMS+button 24 is pushed in browse mode, it enters jump mode. However, the present invention is not limited to this. When receiving a right or left rotation signal a predetermined number of times during a predetermined period of time from the input processing section 41 after the rotary encoder button 26 is rotated, it may enter jump mode.

In this case, in the vehicle audio video device 1, all operations of browse mode can be done by the rotary encoder button 26, the browse button 27, and the back button 28. Since the AMS+button 24 is not used, the operability further improves.

Furthermore, in the above-noted embodiment, the content list CL and the pieces of music content are received from the portable music player via the USB interface 7 and the USB connection processing section 38. Instead, the content list CL and the pieces of music content are received from the portable music player by various kinds of wireless communication methods, such as "Bluetooth (Registered Trademark)", infra-red data association (IrDA), a wireless local area network (LAN) like Institute of Electrical and Electronics Engineers (IEEE) 802.11.

Furthermore, in the above-noted embodiment, in jump mode, when a right or left rotation signal is received via the rotation detection section 46 and the input processing section 41, the jump number is increased or decreased by an amount equivalent to 10 percent of the total item number. However, the present invention is not limited to this. The jump number may be increased or decreased by an amount equivalent to 5 or 15 percent of the total item number, or by an amount set by a user, or the like.

Furthermore, in the above-noted embodiment, the CPU 31 of the vehicle audio video device 1 follows an application program previously stored in the ROM 32 to perform the process of music content search and illumination guidance of the above-noted routine RT1. However, the present invention is not limited to this. The above-noted process of music content search and illumination guidance can be performed by following an application program installed from a storage medium, an application program downloaded from the Internet, or an application program installed in other ways.

Furthermore, in the above-noted embodiment, the vehicle audio video device 1, which is equivalent to a vehicle-mounted device of the present invention, is constituted by the USB interface 7, which is equivalent to a connection section, the browse button 27, which is equivalent to a first operation button, the CPU 31, which is equivalent to a content list acquisition section, the RAM 33, which is equivalent to a storage section, the rotary encoder button 26, which is equivalent to a second operation button, the back button 28, which is equivalent to a third operation button, the LED processing section 42, which is equivalent to a light emitting control section, and the AMS+button 24, which is equivalent to a fourth operation button. However, the present invention is not limited to this. The vehicle-mounted device can be constituted by the connection section, first operation button, content list acquisition section, storage section, second operation button, third operation button, light emitting control section, and fourth operation button that are configured in other ways.

The vehicle-mounted device of the present invention can be applied to, for example, vehicle-mounted devices other than the vehicle audio video device, such as a vehicle audio device and a vehicle navigation device, and a home audio device.

It should be understood by those skilled in the art that various modifications, combinations, sub-combinations and alterations may occur depending on design requirements and other factors insofar as they are within the scope of the appended claims or the equivalents thereof.

What is claimed is:

1. A vehicle-mounted device comprising:
   a connection section connected to an external device;
   a first operation button configured to start a process of searching pieces of content stored in the external device;
   a content list acquisition section configured to acquire, from the external device and when the first operation button is operated, a content list having a hierarchical structure under which the pieces of content are classified as items;
   a storage section configured to store the content list;
   a second operation button having a rotatable and pushable operation controller which when rotated selects an item of the content list displayed on a predetermined display section, and when pushed changes what is displayed among the content list from an upper stratum to a lower stratum and sets the item;
   a third operation button configured to change what is displayed among the content list from the lower stratum to the upper stratum; and a light emitting control section configured to perform operation guidance to prompt performance of a next operation by changing a light emitting state of the second operation button in response to an operation of the first operation button.

2. The vehicle-mounted device according to claim 1, wherein the light emitting control section blinks the second operation button in response to an operation of the first operation button and lights up the second operation button in response an operation of the second operation button.

3. The vehicle-mounted device according to claim 1, wherein the first operation button and the third operation button are provided in a space between the second operation button and a driver's seat, the second operation button being placed on a front panel where the first operation button and the third operation button are provided.

4. The vehicle-mounted device according to claim 1, further comprising:

a fourth operation button configured to skip the items by an amount corresponding to a predetermined ratio with respect to the items of the content list displayed on the display section; and a control section configured to change the ratio each time the second operation button is rotated through a predetermined angle.

5. A method for searching pieces of content via a vehicle-mounted device and an external device comprising:

connecting the vehicle-mounted device to the external device;

starting a process of searching pieces of content stored in the external device by operating a first operation button;

acquiring, from the external device and when the first operation button is operated, a content list having a hierarchical structure under which the pieces of content are classified as items;

storing the content list;

selecting an item of the content list displayed on a predetermined display section via rotation of an operation controller of a second operation button;

changing what is displayed among the content list from an upper stratum to a lower stratum and setting the item when the operation controller of the second button is pushed;

changing what is displayed among the content list from the lower stratum to the upper stratum by operating a third operation button; and performing operation guidance to prompt performance of a next operation by changing a light emitting state of a light emitting section of the second operation button in response to an operation of the first operation button.

6. The method for searching according to claim 5, wherein the performing operation guidance blinks the light emitting section of the second operation button in response to an operation of the first operation button, and lights up the light emitting section of the second operation button in response to an operation of the second operation button.

7. The method for searching according to claim 5, further comprising:

skipping the items by an amount corresponding to a predetermined ratio with respect to the items of the content list displayed on the display section in response to an operation of a fourth operation button; and changing the ratio each time the second operation button is rotated through a predetermined angle.

\* \* \* \* \*